Aug. 20, 1968    W. W. ANDERSON, JR    3,397,932
SEMI-LINEAR BALL BEARING
Filed June 2, 1966

*INVENTOR*
WILLIAM W. ANDERSON, JR.

BY

*ATTORNEYS*

United States Patent Office 3,397,932
Patented Aug. 20, 1968

3,397,932
SEMI-LINEAR BALL BEARING
William W. Anderson, Jr., Newport News, Va., assignor to the United States of America as represented by the Administrator of the National Aeronautics and Space Administration
Filed June 2, 1966, Ser. No. 554,897
7 Claims. (Cl. 308—176)

ABSTRACT OF THE DISCLOSURE

A frictionless bearing having inner and outer sets of rollers engaged with inner and outer races, and including interspersed balls, the balls providing free-rolling translation between the races by rolling movement along the roller sides.

---

The invention described herein was made by an employee of the U.S. Government and may be manufactured and used by or for the Government for governmental purposes without the payment of any royalties thereon or therefor.

This invention relates generally to a semi-linear bearing and more particularly to a separable bearing for a shaft to permit rotation and translational movement of the members.

Various bearing devices have been constructed and utilized which require complicated layers or rows of bearings both of the spherical and roller types. These bearings all have the disadvantage of complicated construction as well as difficulty in assessing load capacity. Generally the prior art bearings are incapable of providing rotational and translational movement of a shaft in a housing or similar structure. For example, Coley 3,043,634 issued July 10, 1962, provides for helical arrangement of the ball bearings to permit rotational and translational movement, but the structure has extreme limitations as to the extent of movement, especially translational.

In order to overcome the disadvantages of the prior art, the instant invention contemplates the use of a pair of rows of rollers separated by ball bearings to permit high load capacities.

It is an object of this invention to provide substantially friction-free rotational and translational movement between two members.

Another object of the instant invention is to provide a high load capacity semi-linear bearing of simple construction that permits rotational and translational movement between members connected to inner and outer races thereof.

A further object of this invention is to provide a semi-linear bearing having two rows of roller bearings separated by spherical bearings all mounted in inner and outer races in order to permit full rotational movement as well as translational movement to the extent of the length of the rollers.

Generally, the foregoing and other objects are accomplished by mounting a row of rollers in an inner race with the rollers being held from translational movement by retainers and flanges mounted on the inner race. A cage locates spherical bearings which are disposed between adjacent inner rollers and between adjacent dumbbell shaped outer rollers that fit within an outer race.

Figure 1:
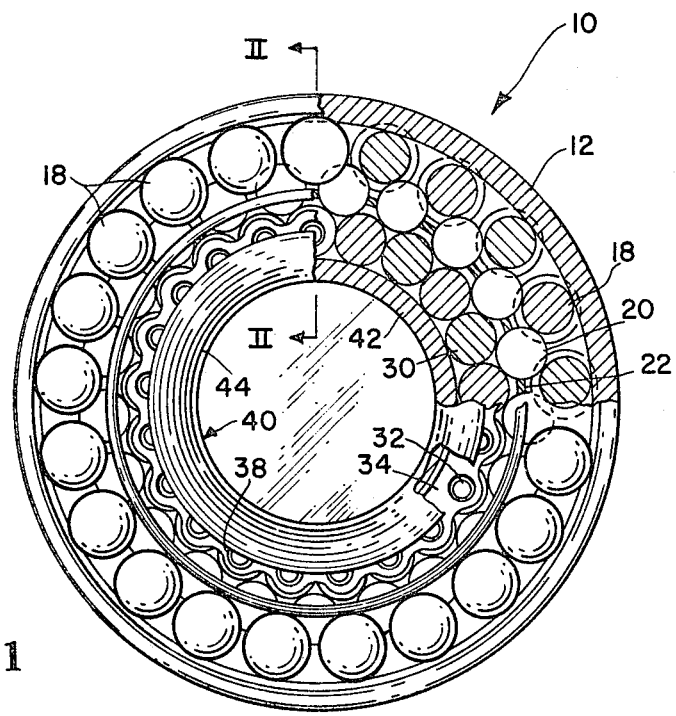
Figure 2:
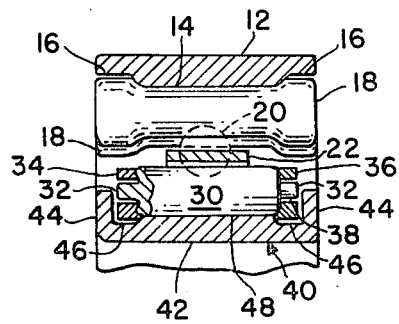

A more complete appreciation of the invention and many of the attendant advantages thereof will be readily apparent as the same becomes better understood by reference to the following dscription when considered in connection with the accompanying drawings wherein:

FIG. 1 is an end view of the instant invention with portions removed for clarity; and FIG. 2 is a cross-sectional view of the portion of the invention shown on line II—II of FIG. 1.

Referring now to the drawings and more particularly to FIG. 1 wherein the instant bearing 10 is shown in an assembled, operable condition for connecting two members; for example, a shaft and housing, not shown. Semi-linear bearing 10 is comprised of outer race 12 having a central enlarged portion 14 and the pair of rabbets 16 on the outer edges, see FIG. 2. Outer rollers 18 are dumbbell shaped to mate with enlarged portion 14 and rabbets 16 of outer race 12. Spherical bearings 20 interfit between adjacent outer rollers 18 and are prevented from unsymmetrical movement by cage 22. Ball bearings 20 also fit between adjacent inner rollers 30 which have projecting pins or stub shafts 32 on each end thereof, which fit within openings 38 in circular retainers 34 and 36. Retainers 34 and 36 are prevented from lateral or translational movement by inner race 40 which includes a cylindrical member 42 and outwardly extending flanges 44. Grooves 46 are in the outer face of cylindrical element 42 adjacent to the inner edges of flanges 44 and receive retainers 34 and 36 to facilitate assembly of the device and prevent the translational movement of inner rollers 30. Grooves 46 delineate cylindrical flat bearing surface 48 for receiving inner rollers 30 and supporting the load therefrom.

Operation

Cylindrical element 42 is attached or mounted on a member such as a shaft, not shown. Inner rollers 30 are permitted rotational movement due to pins 32 fitting in openings 38 and rotate against balls 20 that in turn fit between and rotate with dumbbell shaped outer rollers 18. Thus it is seen that, instead of having the normal two point loading for ball bearings, balls 20 have a four point bearing in that there is one point of bearing on each of the adjacent dumbbell shaped outer rollers and third and fourth points of bearing against adjacent inner rollers 30. Outer race 12 is capable of securement or mounting on a fixed housing or support structure and clearly permits outer rollers 18 to move thereon.

In view of the above, it is obvious that the instant inventive bearing permits the shaft and/or housing, not shown, to rotate and translate by permitting spherical bearing 20 freedom for translational movement the length of the reduced section of outer roller 18. The enlarged end portions of rollers 18 limit from the translational movement of spherical balls 20, and as is typical for separable bearings, external stops, not shown, are required to maintain contact between inner rollers 30 and spherical balls 20. The length of rollers 18 determines the extent of translational movement and a plurality of rows of spherical bearings 20 could be utilized where necessary or desirable for increased load capacity.

Obviously, many modifications of the subject invention are possible in light of the above teachings. It is therefore to be understood that within the scope of the appended claims the invention may be practiced otherwise than as specifically described.

What is claimed as new and desired to be secured by Letters Patent of the United States is:

1. A semi-linear bearing comprising: inner and outer races disposed about an axis; inner and outer bearing means each including elements in rolling engagement with a respective race, and each of said bearing means also including axially extending straight portions; and ball members disposed in engagement with said straight portions, whereby substantially free rolling rotation and translation is permitted between the inner and outer races.

2. The semi-linear bearing of claim 1 wherein said outer bearing means comprises a plurality of dumbbell shaped rollers; and said outer race having rabbets therein shaped to receive said outer bearing means for substantially friction-free contact therebetween.

3. The semi-linear bearing of claim 1 wherein said inner and outer bearing means include inner and outer sets of rollers engaging said inner and outer races respectively, said rollers having straight sides comprising the said portions and said ball members engage the said straight sides.

4. The semi-linear bearing of claim 3 including a pair of circular retainers having spaced openings; and pins extending from each end of said inner rollers, whereby said pins are free to rotate in said openings and said retainers assist in maintaining proper location of said inner rollers.

5. The semi-linear bearing of claim 4 wherein said inner race comprises: a cylinder having outwardly extending flanges on opposite edges thereof; and a pair of grooves in the outer surface of said cylinder adjacent said flanges for locating said retainers and inner rollers.

6. The semi-linear bearing of claim 5 wherein said outer rollers comprises a plurality of dumbbell shaped rollers; and said outer race having rabbets in the edges thereof shaped to receive said outer rollers for substantially friction-free contact therebetween.

7. The semi-linear bearing of claim 6 wherein said ball means are of less diameter than the length of said inner and outer rollers to permit substantial translational and rotational movement between said inner and outer races.

References Cited

FOREIGN PATENTS 1,284,704   1/1962   France.

MARTIN P. SCHWADRON, *Primary Examiner.*

FRANK SUSKO, *Assistant Examiner.*